(12) United States Patent
Nicholson (10) Patent No.: US 6,915,710 B2
(45) Date of Patent: Jul. 12, 2005

(54) METHOD AND APPARATUS FOR CORRECTING ATTENUATION IN AN OPTICAL TORQUE SENSOR

(75) Inventor: Warren B. Nicholson, El Paso, TX (US)

(73) Assignee: Delphi Technology, Inc., Troy, MI (US)

(*) Notice: Subject to any disclaimer, the term of this patent is extended or adjusted under 35 U.S.C. 154(b) by 257 days.

(21) Appl. No.: 10/008,304

(22) Filed: Nov. 6, 2001

(65) Prior Publication Data

US 2003/0084733 A1 May 8, 2003

(51) Int. Cl.[7] .................................................. G01L 3/02
(52) U.S. Cl. .......................... 73/862.324; 73/862.325; 73/862.333
(58) Field of Search ...................... 73/862.324–862.333, 73/862.321; 250/277.16, 304; 356/32

(56) References Cited

U.S. PATENT DOCUMENTS

| | | | | |
|---|---|---|---|---|
| 2,938,378 A | * | 5/1960 | Canada et al. | 73/862.324 |
| 3,474,255 A | * | 10/1969 | White | 250/225 |
| 3,495,452 A | * | 2/1970 | Foskett et al. | 73/862.324 |
| 3,596,100 A | * | 7/1971 | Hollick | 73/862.324 |
| 3,871,215 A | * | 3/1975 | Pratt et al. | 73/862.324 |
| 3,897,766 A | * | 8/1975 | Pratt et al. | 123/406.23 |
| 3,938,890 A | * | 2/1976 | Flavell | 356/370 |
| 4,520,681 A | * | 6/1985 | Moore et al. | 73/862.28 |
| 6,180,937 B1 | | 1/2001 | Troxell et al. | |
| 6,298,311 B1 | | 10/2001 | Griffin et al. | |
| 6,323,487 B1 | | 11/2001 | Wu | |
| 6,362,586 B1 | | 3/2002 | Naidu | |
| 6,400,142 B1 | | 6/2002 | Schroeder | |
| 6,424,896 B1 | | 7/2002 | Lin et al. | |
| 6,513,394 B1 | * | 2/2003 | Gutjahr et al. | 73/862.324 |
| 2003/0010137 A1 | * | 1/2003 | Dalton et al. | 73/862.324 |

* cited by examiner

*Primary Examiner*—Max Noori
*Assistant Examiner*—Alandra Ellington
(74) *Attorney, Agent, or Firm*—Michael D. Smith (57) ABSTRACT

An optical torque sensor comprises a radiation source emitting radiation of at least one wavelength. At least one sensor senses the emitted radiation and generates at least one intensity signal indicative of the intensity of the emitted radiation. At least one signal conditioner is receptive of the emitted radiation and is positioned on a shaft between the radiation source and the at least one sensor thereby conditioning the emitted radiation. A circuit is receptive of the at least one intensity signal and determines the torque acting upon the shaft and compensates for the attenuation of the emitted radiation.

34 Claims, 9 Drawing Sheets

METHOD AND APPARATUS FOR CORRECTING ATTENUATION IN AN OPTICAL TORQUE SENSOR

TECHNICAL FIELD

This invention relates to torque sensors and to a method and apparatus for correcting for attenuation in an optical torque sensor.

BACKGROUND OF THE INVENTION

Electric power steering (EPS) has long been the subject of development by automobile manufacturers because of its fuel economy and ease-of-control advantages as compared to the traditional hydraulic power steering (HPS). However, commercialization of EPS systems has been slow in coming and is presently limited to smaller automobiles due to the cost and performance challenges associated with larger automobiles. Among the challenging technical issues addressed is the use of a sensor positioned on a steering shaft coupled to a steering device and the effect of dirt build-up on the sensor. Dirt build-up typically distorts sensed information associated with the type of high performance sensors needed to meet the steering requirements.

At least two methods for the sensing the rotary positioning of a steering shaft exist. One method utilizes semiconductor-based magnetic sensors (magnetoresistors, or MRs). A second method utilizes the sensing of a signal based on optical detection and magnetic field variation. In the second method, the functionality of optical detectors and encoders is dependent upon environmental and operating conditions. Such conditions typically include dirt build-up and temperature variations, which increase the probability of the occurrence of distortion in the sensed signal.

BRIEF SUMMARY OF THE INVENTION

A method and apparatus for correcting for the effects of dirt and oil build-up on the polarizers of an optical torque sensor are disclosed. An optical torque sensor comprises a radiation source emitting radiation of at least one wavelength. At least one sensor senses the emitted radiation and generates at least one intensity signal indicative of the intensity of the emitted radiation. At least one signal conditioner is receptive of the emitted radiation and is positioned on a shaft between the radiation source and the at least one sensor thereby conditioning the emitted radiation. A circuit is receptive of the at least one intensity signal and determines the torque acting upon the shaft and compensates for the attenuation of the emitted radiation.

A method of compensating for signal attenuation in the sensor comprises generating radiation of at least one wavelength, conditioning the radiation and sensing the radiation. Responsive to the sensed radiation, at least one intensity signal indicative of the intensity of the radiation is generated. The intensity of the radiation due to a combination of the torque acting upon the shaft and the contamination of the sensor is determined. The intensity of the radiation due to the contamination of the sensor only is determined and the difference between the intensity of the radiation due to a combination of the torque acting upon the shaft and the contamination of the sensor and the intensity of the radiation due to the contamination of the sensor only is calculated to generate a compensated signal indicative only of the torque acting upon the shaft.

DETAILED DESCRIPTION OF THE INVENTION

Figure 1:
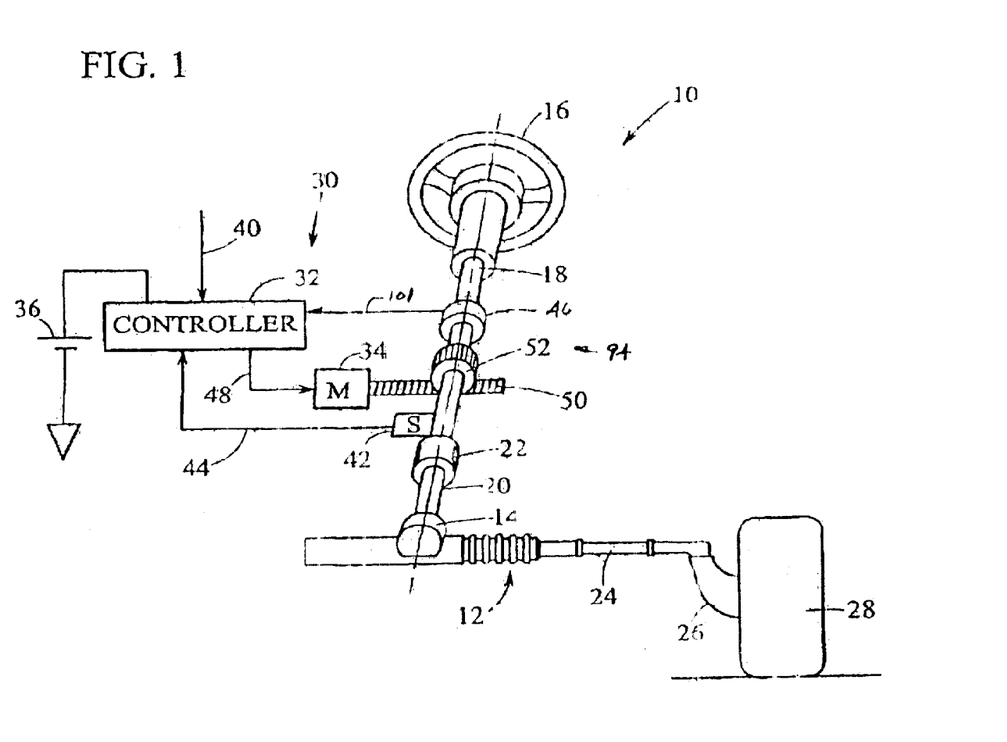
FIG. 1 illustrates a schematic diagram of an electric power steering system.

Referring to FIG. 1, a motor vehicle electric power steering system is shown generally at 10. The system 10 comprises an upper steering shaft 18 in mechanical communication with a lower steering shaft 20 through a universal joint 22, a steering mechanism, shown generally at 12, operably connected to the lower steering shaft 20, and to steerable wheels 28 (only one of which is shown) rotatably and operably connected to the steering mechanism 12. The steering mechanism 12 is a rack-and-pinion type system and includes a toothed rack (not shown) and a pinion gear (not shown) located in a gear housing 14. As a steering wheel 16, disposed on the upper steering shaft 18, is rotated, the upper steering shaft 18 and the lower steering shaft 20 correspondingly rotate axially to in turn rotate the pinion gear. The axial rotation of the pinion gear moves the toothed rack that causes the lateral translation of a set of tie rods 24 (only one of which is shown) that move a set of steering knuckles 26 (only one of which is shown) to turn steerable wheels 28 (only one of which is shown).

Electric power steering, or torque, assist is provided through the unit generally designated by reference numeral 30 which includes a controller 32 and an electric motor 34 responsive thereto. The controller 32 is in electronic communication with, and is powered by, a power supply 36. The controller 32 also receives a vehicle velocity input signal 40. The steering wheel angle is measured using a position sensor 42, which may be an optical encoding type sensor, a variable resistance type sensor, or any other suitable type of position sensor. A signal 44 representative of the angle of the steering wheel 16 is then provided as input to the controller 32.

As the steering wheel 16 is turned, a torque sensor 46, positioned between the upper steering shaft 18 and the lower steering shaft 20 senses the torque applied to the steering wheel 16 by an operator of the motor vehicle. The torque sensor 46, provides as output a variable analog voltage signal 101 to the controller 32 in relation to the degree of twist of a torsion bar 78 (FIG. 2A) connecting the upper and lower steering shafts 18, 20.

In response to the vehicle velocity input 40, the input from position sensor 42, and the input from torque sensor 46, the controller 32 transmits a signal 48 in the form of a current command or a voltage command to the electric motor 34. In response thereto, the electric motor 34 supplies torque assistance to the steering system 10 through a worm 50 and a worm gear 52 in such a way so as to provide a torque to the vehicle steering, thereby assisting the driving force exerted by the vehicle operator on steering wheel 16.

Figures 2A, 2B, 2C:
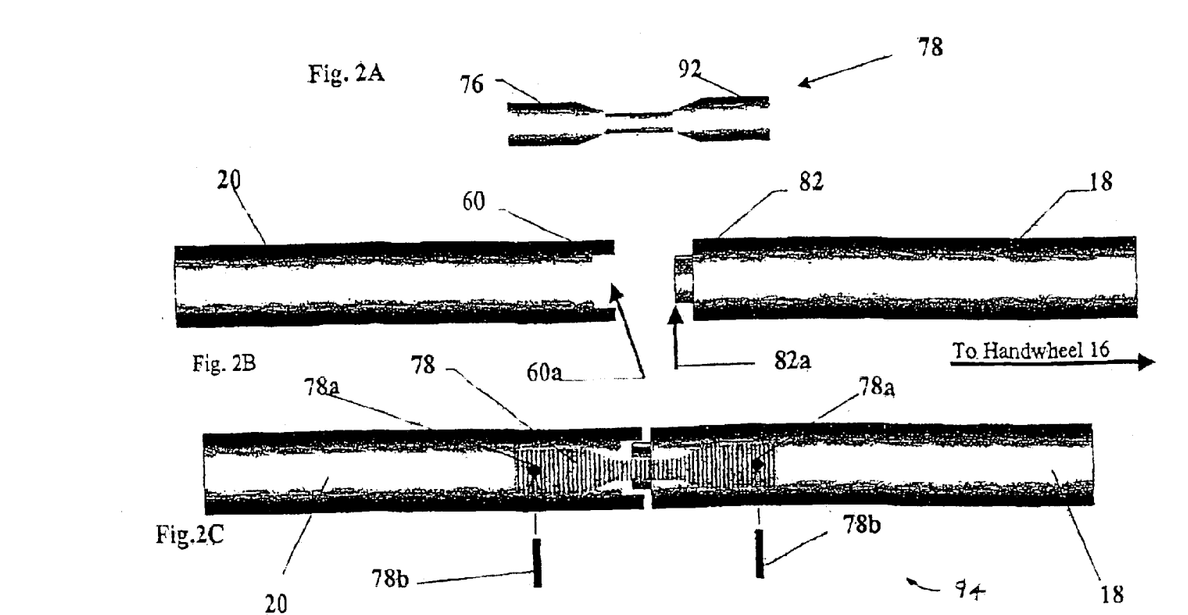
FIG. 2A is a diagram of a torsion bar.
FIG. 2B is a diagram of an upper and lower steering shaft of the electric power steering system of FIG. 1.
FIG. 2C is a diagram of the upper and lower steering shafts of FIG. 2B engaged to form a single steering shaft.
Figure 2D:
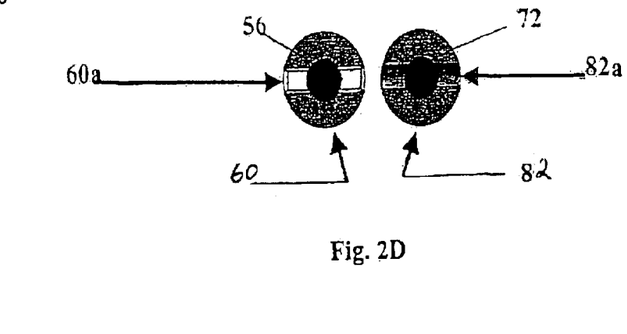
FIG. 2D is a cross sectional view of the upper and lower steering shafts of FIGS. 2B and 2C.

Referring to FIGS. 2A, 2B, 2C and 2D in conjunction with one another, a torsion bar 78, the upper steering shaft 18 and the lower steering shaft 20 are shown. In particular, FIG. 2C shows the assembly of the torsion bar 78, the upper steering shaft 18 and the lower steering shaft 20. In FIG. 2A, the torsion bar 78 with a lower end 76 measurement portion 74 and upper end 92 is depicted. In FIG. 2B, one end 82 of the upper steering shaft 18 has a stoptooth or blade 82a that is positioned across the end 82 of the upper steering shaft 18 and extends from the surface thereof. The end 82 of the upper steering shaft 18 also has a center hole 72 (FIG. 2D) equal to the diameter of the largest diameter of the upper end 92 of the torsion bar 78, milled to a depth of slightly less than one half of the length of the torsion bar 78. One end 60 of the lower steering shaft 20 has a notch 60a that is positioned across the end 60 of the lower steering shaft 20 and extends from the surface thereof inward to a depth of slightly greater than the length of the stoptooth 82a. The end 60 of the lower steering shaft 20 also has a center hole 56 (FIG. 2D) equal to the diameter of the largest diameter of the upper end 92 of the torsion bar 78, milled to a depth of slightly less than half of the length of the torsion bar 78.

The torsion bar 78, with a known torsional spring rate, k, (typically about 1.5 Nm per degree) is pressed into the center holes 56, 72 of the upper 82 and lower 60 shaft ends with the stoptooth 82a centered within the notch 60a. Holes 78a are drilled through the upper and lower shafts 18, 20 and the torsion bar 78 as indicated in FIG. 2C. Oversized pins 78b are pressed into the holes 78a to lock the torsion bar 78 and the upper and lower steering shafts 18, 20 together. At this point the only mechanical connection between the upper 18 and lower 20 steering shafts is through the torsion bar 78 and the assembly comprises essentially a single steering shaft 94. The stoptooth 82a and notch 60a are designed to allow about ±10 degrees of twist of the torsion bar 78 before the stoptooth 82a and notch 60a engage to carry any further torsional load. Since the spring rate, k, of the torsion bar 78 is known, if a measurement of the differential angle, θ, between the upper 18 and lower 20 steering shafts is made, then the torque, T, acting upon the steering shaft 94 can be calculated as follows:

$$T = k \times \theta. \tag{1}$$

Automotive requirements make the measurement of the differential steering angle, θ, between the upper steering shaft 18 and the lower steering shaft 20 difficult. The automotive environment with dust, dirt, various fluids and extreme temperature variations make long term and high-resolution measurements very difficult.

The resolution required for the measurement of torque, T, is about 0.02 Nm, which translates into about 0.013 degrees. For a sensor with a sensing diameter of about 65 mm or 2.56 inches, 0.013 degrees is a mechanical resolution of about 7.4 μm or about 0.0003 inches. Since the upper 18 and lower 20 steering shafts are only connected by the relatively smaller diameter torsion bar 78, motions, other than rotation, are possible between the shafts 18, 20. These extraneous motions introduce mechanical noise, which can be as much as 40 times greater than the measurement resolution (about 300 μm or about 0.012 inches). Sensor manufactures have used various coupling joints, (e.g., Oldham coupler) to make sensors immune to unwanted radial and axial motions only to introduce hysteresis and noise. Any contacting method, such a variable resistor, has a problem with long term rotary contact wear. The automotive industry typically requires parts to have life times in excess of 10 years; this means that almost all sensors that have been contacting will change to a non-contacting sensors.

An optical polarization method of measuring the differential steering angle, θ, has many advantages over other measurement techniques. This method, being non-contacting and insensitive to unwanted mechanical motions, is the basis of a differential angle sensor. Polarization of light is insensitive to the radial or axial motions of polarizers or of the source. A change in the intensity, I, (e.g. attenuation) of light after passing through two polarizers occurs if the angle, ψ, between the polarization axes of the polarizers changes.

The transfer function of light intensity, I, passing through two polarizers varies as the square of the cosine of the angle, ψ, such that at an angle of ψ=0°, or when the polarization axes of the two polarizers are parallel with one another, the transmitted light intensity will be at a maximum or 1, and when ψ=90°, or when the polarization axes of the two polarizers are perpendicular to each other, the transmitted light intensity will be at a minimum or 0. At an angle of ψ=45°, the transmitted light intensity will be 0.5 or 50% (i.e., $\cos^2$ of 45°=0.5). Since the stoptooth 82a on the upper steering shaft 18 captured within the notch 60a of the lower steering shaft 20 limits the angle ψ to about ±10° the place for the sensor to operate is at ψ=45°±10°. At ψ=45°±10° the intensity of the light is about 67% at 35° and about 33% at 55° for a total intensity range of 34%, or 50%±17%. Even with a $\cos^2$ transfer function, within the range of ψ=45°±10°, the intensity change is linear to about 0.1%. It will be recalled that the steering wheel 16 can be turned about ±2.5 turns from the straight-ahead position and it is only the differential steering angle, θ, between the upper and lower steering shafts 18, 20, or of the torsion bar 78, that is being measured. Since the measurement of the differential steering angle, θ, is directly related to the measurement of changes in light intensity, or the electrical signal representing the change in light intensity, any other factors that could affect the change in light intensity or electrical signals must be controlled.

Figure 3:
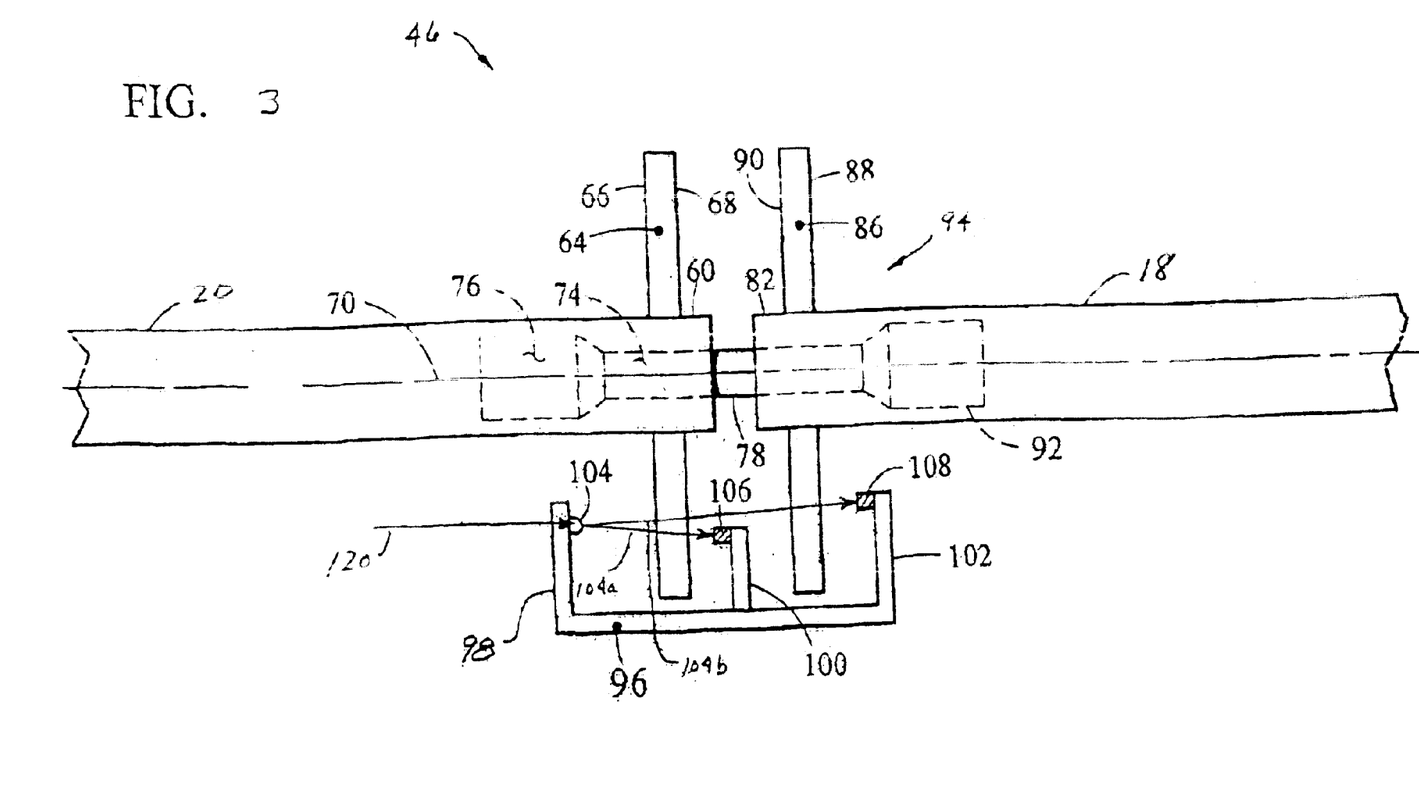
FIG. 3 is a first schematic diagram of a torque sensor coupled to the steering shaft of FIG. 2C.

Referring to FIG. 3, the upper 18 and lower 20 steering shafts are shown assembled as in FIG. 2C without showing the notch 60a and the stoptooth 82a. A torque sensor, for sensing the torque applied to the steering shaft 94 is shown generally at 46. A longitudinal axis 70 extends through the upper and lower steering shafts 18, 20, and the torsion bar 78. The torque sensor 46 includes a first signal conditioner, such as a polarizer 64, disposed on the outer surface of and at the end 60 of the lower steering shaft 20. The first polarizer 64 is generally disk-shaped and includes a first surface 66 and an opposing second surface 68 and has an axial center that corresponds with the longitudinal axis 70.

The torque sensor 46 includes a second signal conditioner, such as a polarizer 86 disposed on the outer surface of and at the end 82 of the upper steering shaft 18. The second polarizer 86 is generally disk-shaped and includes a first surface 88 and an opposing second surface 90 and has an axial center that corresponds with the longitudinal axis 70. The positioning of the first and second polarizers 64, 86 is such that any rotation of the upper steering shaft 18 with respect to the lower steering shaft 20 results in a corresponding rotation of the torsion bar 78 and of the second polarizer 86 with respect to the first polarizer 64. Thus, $\Delta\theta = \Delta\psi$.

Continuing in FIG. 3, light 104a emitted from a source 104, such as a light emitting diode (LED), passes through the first polarizer 64 where it is polarized and falls upon a first sensor or photodetector 106. The light 104b also passes through the second polarizer 86 and falls upon a second sensor or photodetector 108. As best understood from FIG. 3, the reference numerals 104a and 104b designate the same beam of light, i.e., a single light beam of a specific wavelength, and are differentiated only to indicate different geometrical paths of the different segments 104a, 104b of the beam. The intensity of the light falling upon the second photodetector 108 follows the cosine squared of the differential angle, ψ, between the polarization axes of the two polarizers 64, 86. However, one must consider the stability of the light source. The intensity variations measured by the second photodetector 108 could come from a change in the angle ψ or from a change in the light intensity, ΔI, of the source 104. Placing a photodetector near the light source 104 and making a feedback loop to keep the light output constant could correct this effect. However, most light sources are at least weakly polarized and, even with a constant light output from the source 104, the light level after the first polarizer 64 could vary a slight amount depending upon the amount of polarization of the source 104 and the angle, Φ, between the polarization of the source 104 and the axis of polarization of the first polarizer 64. This second effect can be corrected by simply moving the photodetector from near the source 104 to a position after the first polarizer 64. The placement of the photodetector 106 after the first polarizer 64 and connected in a feedback control loop with the LED source 104 assures a constant light level going into the second polarizer 86.

The only effect that can now cause a major error that is unaccounted for at this point is contamination on the second polarizer 86. Any contamination on the second polarizer 86 will decrease the light intensity at the second photodetector 108 and may be misinterpreted as a change of differential polarization angle, Δψ. A novel method for correcting for the effects of contamination on the second polarizer 86 is presented.

The first photodetector 106 is positioned such that the first polarizer 64 is positioned between the light source 104 and the first photodetector 106. The second photodetector 108 is positioned such that both the first polarizer 64 and the second polarizer 86 are positioned between the light source 104 and the second photodetector 108. The second polarizer 86 is positioned between the first and second photodetectors 106, 108.

The polarizers 64, 86 are configured to rotate about the centerline 70 relative to one another while the light source 104 and the first and second photodetectors 106, 108 remain stationary relative to the polarizers 64, 86. Light generated by the light source 104 passes through the relative moving polarizers 64, 86. A portion of the light 104a generated by the light source 104 that passes through first polarizer 64 is received by the first photodetector 106. The portion of the light 104b that is not received by the first photodetector 106 passes through the second polarizer 86 and is received by the second photodetector 108.

Figure 4:
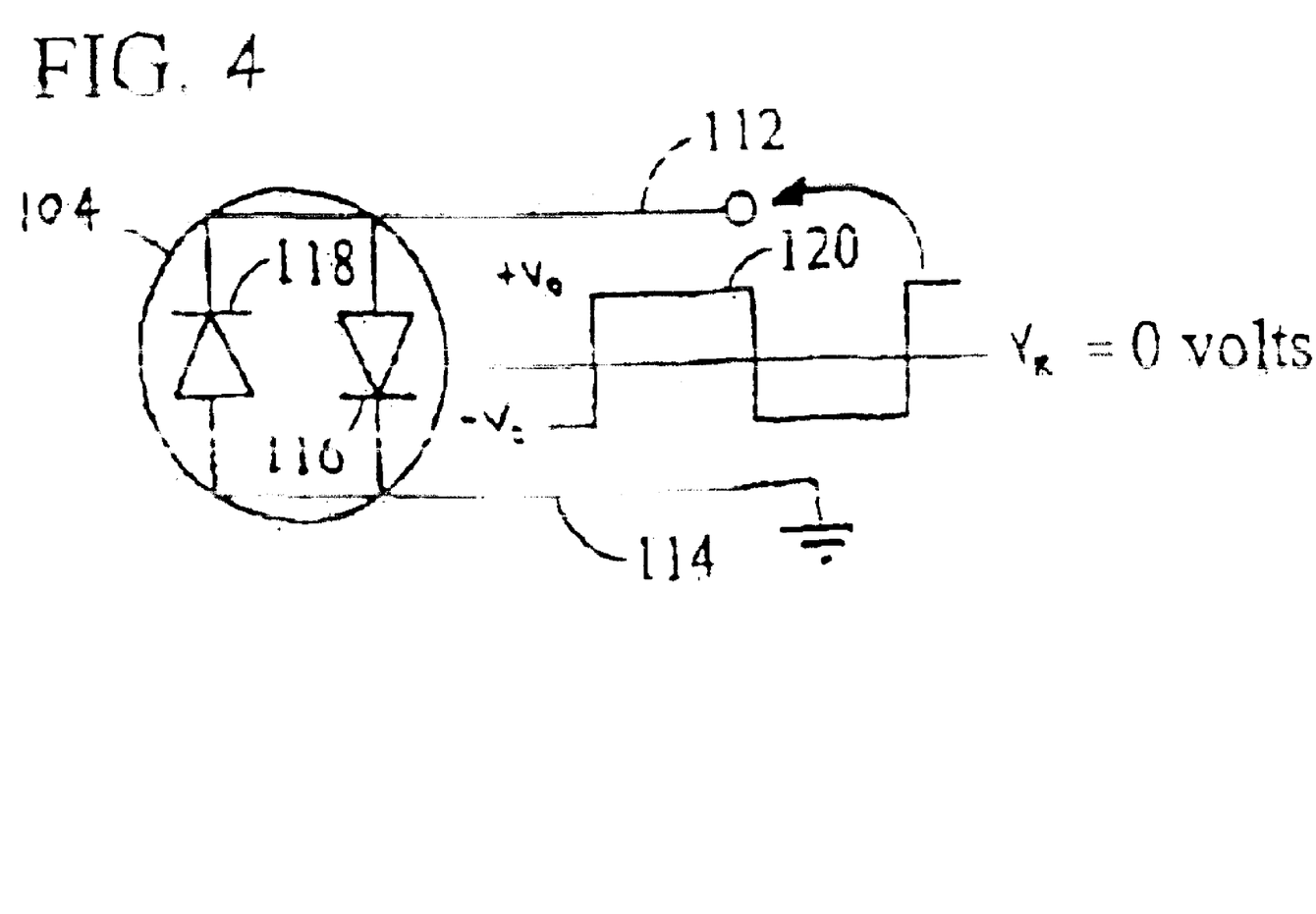
FIG. 4 is a schematic diagram of an electro-optic circuit having a multicolored light source.

Referring now to FIG. 4, the operation of the light source 104 and its relationship with the first photodetector 106 and the second photodetector 108 is described. The light source 104 comprises a multicolored light emitting device, such as one or more light emitting diodes (LED) operative to generate light at a plurality of wavelengths. The multicolored light source 104 generates a first beam of light at a first wavelength which is polarizable, and a second beam of light at a second wavelength that is not polarizable. The polarizable light is typically visible light having a characteristic wavelength range of about 565 nm to about 630 nm, and the non-polarizable light is typically infrared light having a characteristic wavelength range of about 900 nm to about 950 nm. The beam of light 104a passes through the first polarizer 64 and is detected by the first photodetector 106. A quantity of the beam of light 104b also passes through the second polarizer 86 where it is detected by the second photodetector 108.

The above multicolored light is generated by the configuration of elements shown in FIG. 4. The multicolored light source 104 includes an input lead 112 and a first LED 116 and a second LED 118. The two LEDs 116, 118 are electrically configured whereby when a bi-polar input signal 120 is applied to input lead 112, the two LEDs 116, 118 are alternately activated to generate light. For example, LED 116 may be a diode that emits green light at a wavelength that is within a range subject to transmission reductions by the polarizers 64, 86. LED 118 may be a diode that emits infrared light at a wavelength that is not within a range subject to transmission reductions by the polarizers 64, 86.

Figure 7:
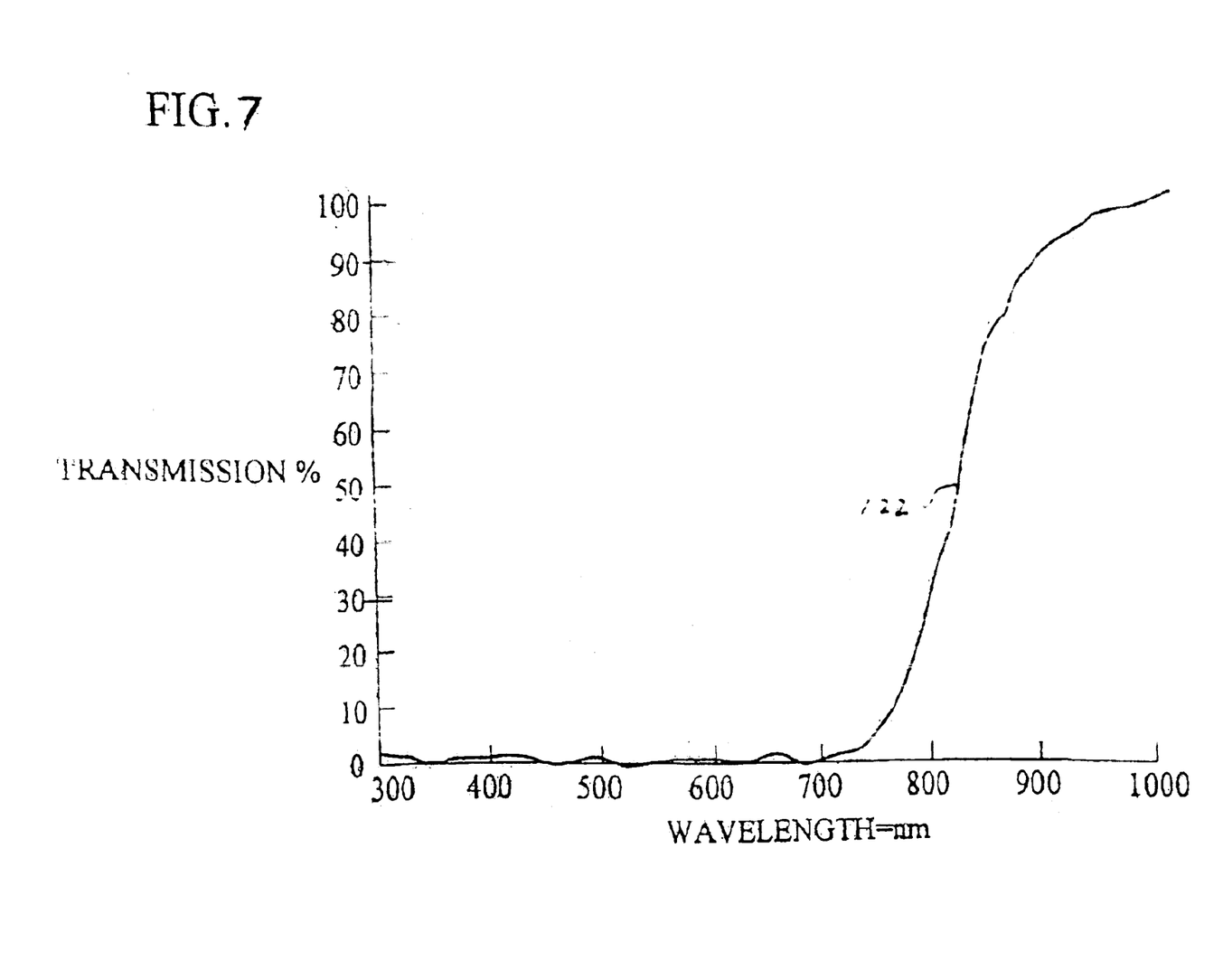
FIG. 7 shows the optical transmission characteristics of two thin film polarizers with their polarization axes at right angles with respect to one another.

Certain polarizers do not polarize infrared light. For instance, the dyes used in the manufacture of long chain polymers which are subsequently used to construct thin film polarizers, have little or no effect upon light having wavelengths in the infrared. The change in the intensity of light in the visible wavelengths, when the axes of the polarizers 64, 86 go from crossed (ψ=90°) to uncrossed (ψ=0°), can range between about 30–40 decibel (dB). When the wavelength is greater than about 900 nanometers (nm) little or no change in intensity is realized. However, a certain amount of fixed attenuation does occur due to the polarizers 64, 86. FIG. 7 illustrates the relationship between the transmission of light through a pair of crossed thin film polarizers as a function of wavelength. As shown in FIG. 7, when the wavelength is greater than about 900 nm, e.g., infrared (IR), the effect of the polarizers upon the transmission of light through the polarizers is negligible, and nearly all of the light is transmitted therethrough. Contrariwise, when the wavelength is less than about 800 nm, e.g. in the visible, the effect of the polarizers upon the transmission of light is significant and little light is transmitted therethrough.

Figure 5:
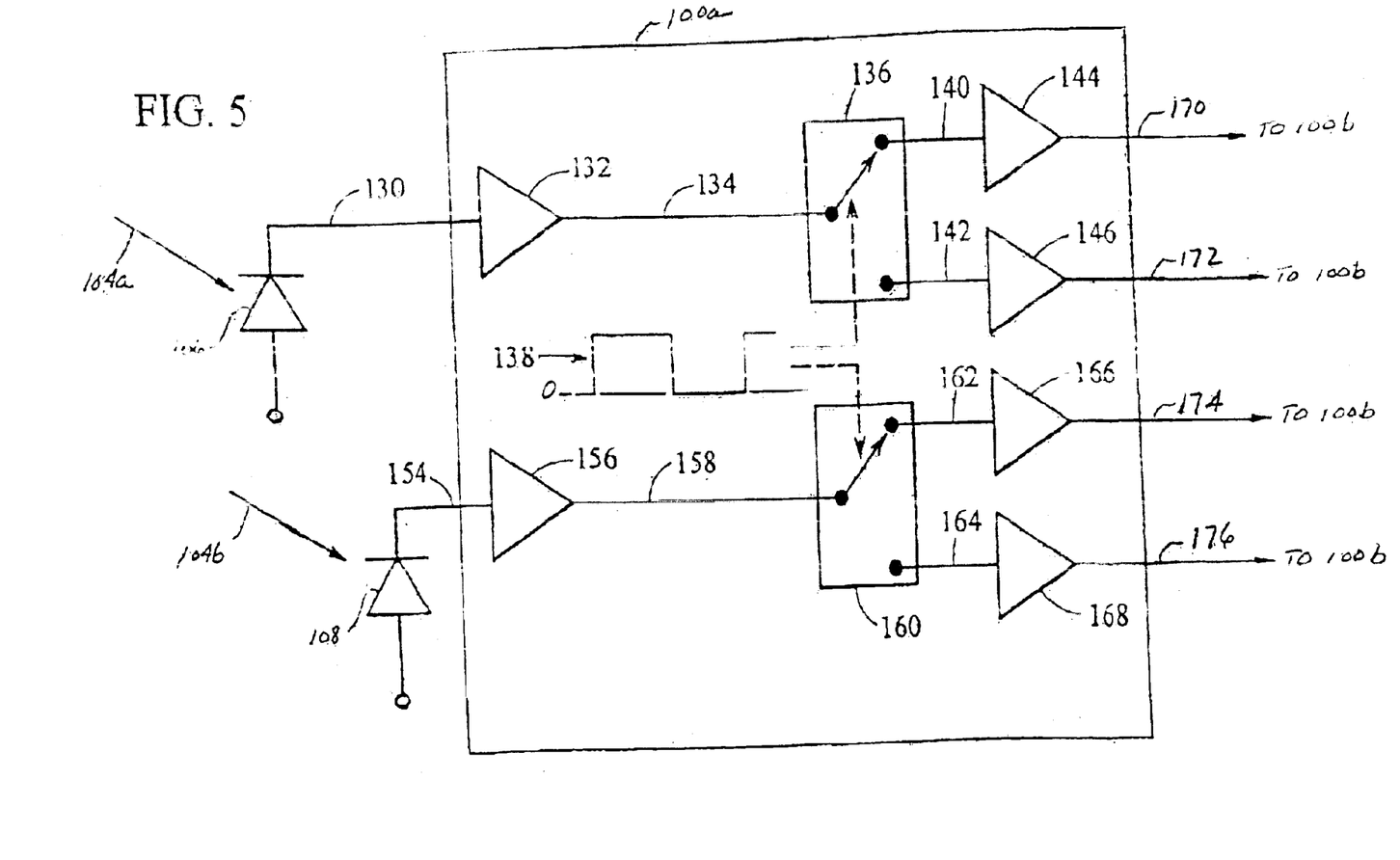
FIG. 5 is a schematic diagram of the electronic configuration of a set of photodetectors.
Figure 6:
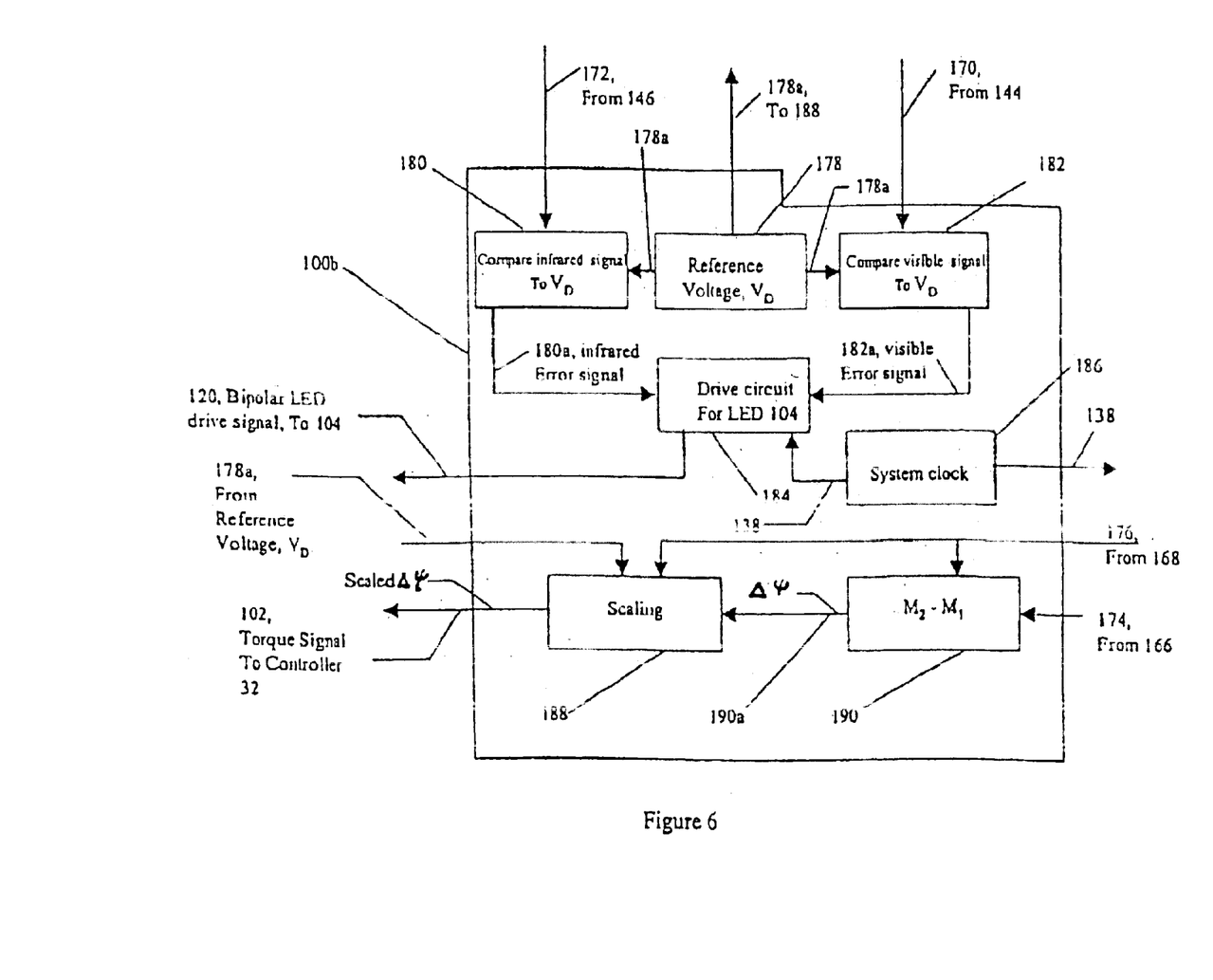
FIG. 6 is a schematic diagram of signal processing electronics for the set of photodetectors of FIG. 5.

Referring to FIG. 5 in conjunction with FIG. 6, the first photodetector 106 for receiving the light beam 104a passing through the first polarizer 64 is shown connected to the first part of an electric circuit 100a, 100b for determining the torque, T, applied to the shaft 94 and for compensating for attenuation in the torque sensor 46. The first photodetector 106 comprises a photo-diode that receives or captures light 104a from the first polarizer 64 and transforms such light 104a into an electrical signal 130 that is transmitted to a first amplifier 132. An amplified output signal 134 from the first amplifier 132 is provided as input to a first solid state switch 136. The first solid state switch 136 is controlled by a timing signal 138 that causes the first solid state switch 136 to select or alternate between a pair of output leads 140, 142. The timing signal 138 will preferably be in synchronization (in phase) with the bi-polar input signal 120 of FIG. 4 wherein the polarizable portion and the non-polarizable portion of the output of the multi-colored LED device are measured in synchronization. A first output signal at 140, from the first solid state switch 136, is amplified, rectified and filtered by a second amplifier 144 which produces a DC voltage output signal 170 indicative of the intensity of the polarized visible light captured by the first photodetector 106. A second output signal at 142, from the first solid state switch 136, is amplified, rectified and filtered by a third amplifier 146 which produces a DC voltage output signal 172 indicative of the intensity of the non-polarized infrared light captured by the first photodetector 106.

Still referring to FIG. 5 in conjunction with FIG. 6, the second photodetector 108 for receiving the portion of light 104b passing through both polarizers 64, 86 is shown connected to the first part of the electric circuit 100a, 100b. The second photodetector 108 comprises a photo-diode that receives or captures light 104b from the second polarizer 86 and transforms such light to an electrical signal 154 that is transmitted to a fourth amplifier 156. An output signal 158 from the fourth amplifier 156 is provided as input to a second solid state switch 160. The second solid state switch 160 is controlled by the bi-polar signal 138 that causes the second solid state switch 160 to toggle between a pair of output leads 162, 164. As above, timing signal 138 will preferably be in synchronization (in phase) with bi-polar input signal 120 of FIG. 4 wherein the polarizable portion and the non-polarizable portion of the output of the multi-colored LED device are measured in synchronization. A third output signal at 162, from the second solid state switch 160, is amplified, rectified and filtered by a fifth amplifier 166 which produces a DC voltage output signal 174 indicative of the intensity of the polarized visible light captured by the second photodetector 108. A fourth output signal 164 from the second solid state switch 160 is amplified, rectified and filtered by a sixth amplifier 168 which produces a DC voltage output signal 176 indicative of the intensity of the non-polarized infrared light captured by the second photodetector 108. The values of signals 170, 172, 174 and 176 are retained for the appropriate number of cycles.

Figure 8:
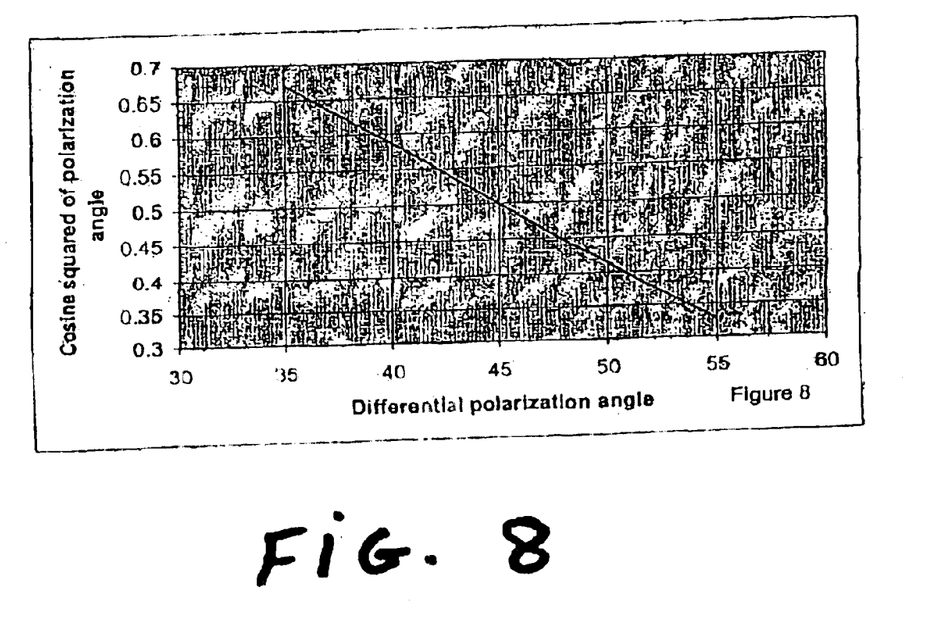
FIG. 8 is a graphical representation of the intensity of light (or $\cos^2$ of the polarization angle $\psi$) detected at a photodetector of FIG. 5 as a function of the change in differential polarization angle $\psi$.

Amplifiers 144 and 146 rectify and filter the time switched signals 140 and 142 to produce the DC voltage output signals 170 and 172. These signals 170, 172 are initially adjusted to equal a reference voltage, $V_D$, at 180 in FIG. 6. As such, the error signals 180a and 182a are initially equal to zero. During the operation of the torque sensor 46, the output signals 170 and 172 are each compared to the reference voltage, $V_D$, 178 at 180 and 182 (FIG. 8). If signal 172 is not equal to the reference voltage, $V_D$, 178, a first nonzero error signal 180a indicative of the difference between the output of amplifier 146 and the reference voltage, $V_D$, 178 is generated. Likewise, if signal 170 is not equal to the reference voltage, $V_D$, 178, a second nonzero error signal 182a indicative of the difference between the output of amplifier 144 and the reference voltage, $V_D$, 178 is generated. The error signals 180a, 182a are provided as input to an LED drive circuit 184 where they are processed. The LED drive circuit 184 provides as output a drive signal 120. The drive signal 120 is delivered to the light source 104 and is operative thereby to adjust the intensities of the outputs 104a, 104b of the visible and infrared LEDs 116, 118 of the light source 104 so as to cause signals 170 and 172 to again equal the reference voltage, $V_D$, 178. The reference voltage, $V_D$, 178 is the output voltage of a bandgap diode having a temperature stability of about 10 parts per million per degree centigrade and a similar stability per year. Thus the light intensity after the first polarizer 64, as measured by the first photodetector 106, will remain substantially constant over time, temperature, source polarization and contamination.

The wavelength being emitted from the light source 104 is dependent upon the polarity of the bi-polar signal 120 (FIG. 4) at 112. If the bi-polar signal 120 is a square wave that toggles or alternates between a positive and a negative value (e.g., $+/-V_O$) with respect to a zero reference voltage ($V_R$), then the output of the light source 104 will toggle or alternate between a first wavelength, $\lambda_1$, and a second wavelength, $\lambda_2$. Therefore, by selecting one wavelength in the visible range and a second wavelength in the infrared range, the attenuation of the light output 104a, 104b of the source 104 due to changes in ψ, as well as the attenuation due to contamination of the second polarizer 86 can be measured. The visible and infrared intensities measured by the first photodetector 106 are used only for keeping the light intensities constant going into the second polarizer 86. The first photodetector 106 is not used in the determination of the change in the polarization angle nor determination of the contamination of the second polarizer 86. For example, in FIG. 5, when the multi-colored LED 104 is switched to a visible wavelength, the output 134, 158 of the photodetectors 106, 108 is concurrently switched, by the solid state switches 136, 160, to the circuitry 100*a*, 100*b* for measuring the attenuation due to changes in the angle ψ, and the attenuation due to the contamination of the second polarizer 86. Switching the LED 104 to an infrared wavelength, concurrently switches the output 134, 158 of the photodetectors 106, 108 to the circuitry 100*a*, 100*b* that measures the attenuation due only to the contamination of the second polarizer 86. The measured infrared attenuation ($M_1$), which is due only to the contamination of polarizer 86, is used as a correction factor, ($A_c$), and is applied to the intensity indicative of the attenuation due to changes in the angle ψ combined with attenuation due to contamination. In automotive steering applications, the rate of switching would generally be in the range of about 20–50 kHz. The infrared intensity signal 176, from the second photodetector 108, is originally adjusted to match the reference voltage, $V_D$, from the reference voltage source 178 at calibration. Thus, any increase in the optical path attenuation through polarizer 86 will cause the infrared intensity signal 176 to have a lower value and would be represented as a voltage change that is compared to the reference voltage level, $V_D$. Furthermore, the use of infrared light, which is not polarized by the polarizers 64, 86, allows for the measurement of the attenuation due to the second polarizer 86. When all of the optical intensities are accounted for, it is possible for an optical torque sensor, based upon a change in the angle, ψ, between the polarization axes of the polarizers, to be accurate, stable, and substantially immune to contaminates.

When the angle ψ, between the axes of polarization of the polarizers 64, 86, changes, the total path attenuation between the light source 104 and the second photodetector 108 changes. The total path attenuation can also be changed by contamination from dirt and oils on the polarizers 64, 86. If the path attenuation can be measured without the attenuation due to Δψ but with the attenuation due only to contamination ($M_1$, in the infrared wavelengths), and then measured with the attenuation due to Δψ combined with the attenuation due contamination ($M_2$, in the visible wavelengths), then the difference between the two measurements, $M_2-M_1$, equals the attenuation due only to a change in ψ, which is a measure of the torque applied to the shaft 18, 20, thus compensating for contamination of the second polarizer 86. This calculation is exemplified in Eq. 2:

$$M_2-M_1 = \text{attenuation due only to } \Delta\psi\{A_p+A_c\}-A_c=A_p \qquad (2)$$

where $A_p$ is the attenuation due to a change in ψ and $A_c$ is the attenuation due to contamination of the second polarizer 86. Equation 2 is performed at the summing device 190 in FIG. 6.

This is accomplished in this method by using two different wavelengths of light from the source 104 and polarizers 64, 86 that polarize light at a first wavelength and not at a second wavelength (FIG. 6). The output from the photodetectors 106, 108 will first measure the intensity of the output of the first LED (in the visible) followed in time with the measurement of the intensity of the second LED (in the infrared). The intensity signals 170, 172 from the first photodetector 106, are compared to the reference voltage, $V_D$, 178 at 180, 182. Error signals will result if the intensities of signals 170 and 172 do not match the voltage reference, $V_D$, at 178. The visible error signal 182*a* and the infrared error signal 180*a* are provided as input to the LED drive circuit 184 which adjusts the drive current for each polarity of the LED drive signal 120 to keep the measured visible and infrared intensities constant at photodetector 106. The time-separated visible 174 and infrared 176 output signals from the second photodetector 108 are amplified, rectified and filtered and their difference, $\Delta I_p$, is calculated at 190 to remove the component of attenuation due to contamination. The difference 190*a*, is indicative of the attenuation due to a change in ψ.

The difference 190*a* is then sent to the scaling electronics 188 where the difference 190*a* is scaled as needed to meet customer requirements. When the torque sensor 46 is initially calibrated the gain of amplifiers 144, 146, 166 and 168 is adjusted so that the intensity levels of 170, 172, 174 and 176 are referenced to the reference voltage reference, $V_D$, 178. Thus, if the infrared total path attenuation increases, then signal 176 decreases and the difference signal 190*a* (indicative of Δψ) can be multiplied by a gain factor, equal to the ratio of the value of signal 178*a* to the value of signal 176, at 188 to return the difference signal 190*a* to the correct level. For example, if the value of signal 176 decreases by a factor of two, the gain factor is equal to two. This adjustment is done in the scaling 188 portion of the electronics.

At calibration, when the polarizers are set at 45°, zero torque is acting upon the shaft 18, 20. The differential range of ψ from the starting point of 45° is limited to ±10° and, as seen in FIG. 8, there is a linear change in the intensity of light (or $\cos^2$ of the polarization angle ψ) captured at the second photodetector 108 with the change in differential polarization angle ψ. In the scaling 188, zero torque (or 45° polarization angle) is set at 2.5V DC at 178*a* and, for example, at +10° is adjusted to 4.5V DC which is a 2 volt span for a 10° differential angle change. This is 0.2V DC per degree or 0.005° per mV. The steering controller 32 uses this known linear transfer function to calculate torque by Eq. 1 as T=k×θ or $$T=k\times(\{\text{sensor output in mV}-2500\text{ mV}\}\times 0.005°) \qquad (3)$$

Figure 9:
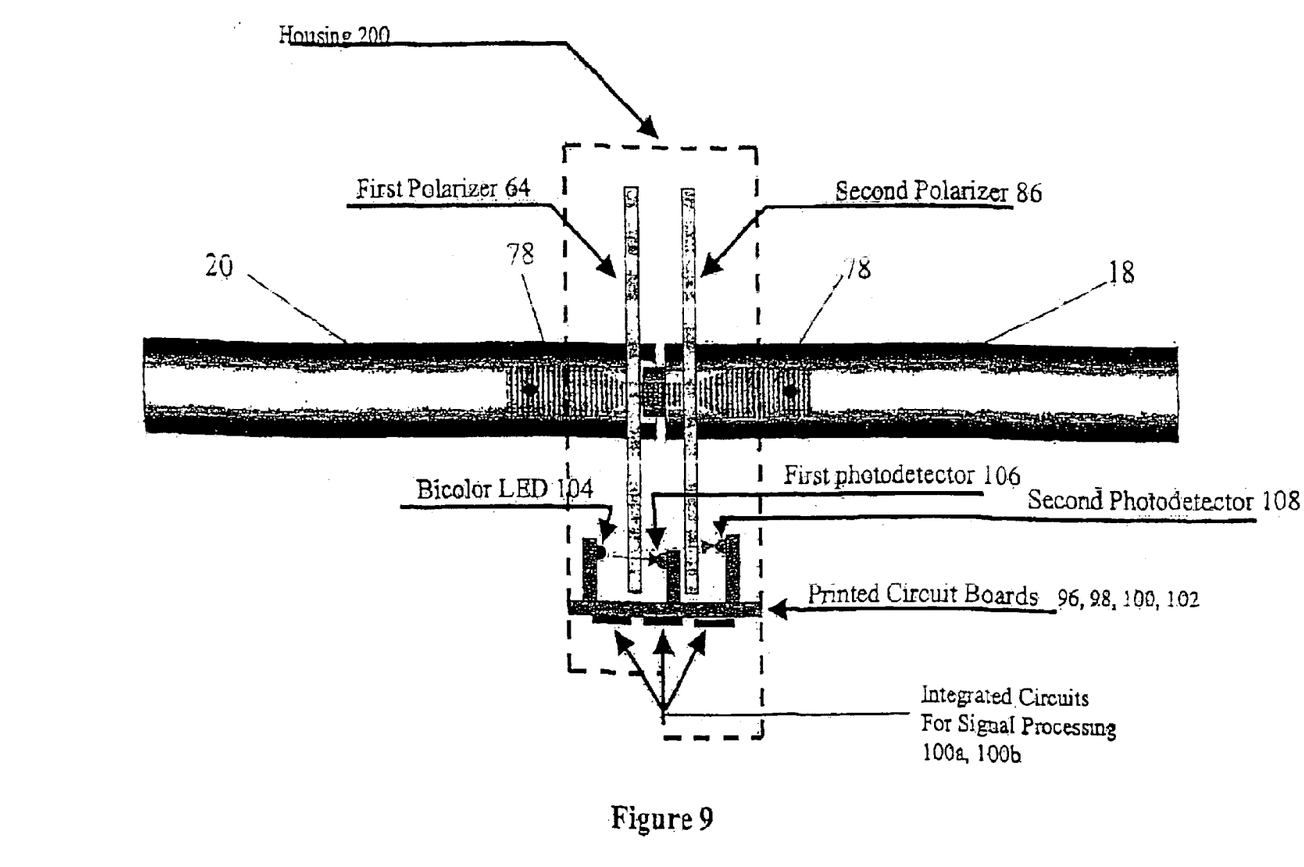
FIG. 9 is a schematic diagram of the torque sensor of FIG. 3 including integrated circuits, printed circuit boards and a protective housing or cover.

It will be appreciated that the circuit 100*a*, 100*b* may be located either within the controller 32 remote from the LED 104, the photodetectors 106, 108 and the polarizers 64 or may be located in close proximity thereto as an integral part thereof remote from the controller 32. It will also be appreciated that, as seen in FIGS. 3 and 9, the circuit 100*a*, 100*b* may comprise integrated circuits mounted on printed circuit boards 96, 98, 100, 102. Still further, the radiation source 104, first and second photodetectors 106, 108 and first and second polarizers 64, 86 are encased within a protective housing or cover 200.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting the claims.

What is claimed is:

1. A torque sensor for determining the torque acting upon a shaft, the torque sensor comprising:
   a radiation source emitting radiation of at least one wavelength:
   at least one sensor sensing the emitted radiation generating thereby at least one intensity signal indicative of the intensity of the emitted radiation;
   at least one signal conditioner receptive of the emitted radiation and positioned on a shaft between the radiation source and the at least one sensor thereby conditioning the emitted radiation;
   a circuit receptive of the at least one intensity signal determining thereby the torque acting upon the shall and compensating for the attenuation of the emitted radiation;
   wherein the at least one signal conditioner comprises a plurality of polarizers having polarization axes oriented at prescribed angle with respect to one another; and
   wherein the plurality of polarizers are substantially opaque to radiation at the first wavelength and substantially transparent to radiation at the second wavelength.

2. The torque sensor as set forth in claim 1 wherein the radiation source comprises a plurality of parallel light emitting diodes having alternate anodes connected either to electrical ground or energized by a prescribed voltage and alternate cathodes connected either to electrical ground or energized by the prescribed voltage.

3. The torque sensor as set forth in claim 1 wherein the plurality of polarizers comprises thin film polarizers.

4. The torque sensor as set forth in claim 3 wherein the thin film polarizers comprise dyes of long chain polymers.

5. A method of compensating for signal attenuation in a sensor sensing the torque acting upon a shaft, the method comprising:
   generating radiation of at least one wavelength;
   conditioning the radiation;
   sensing the radiation;
   responsive to the sensed radiation, generating at least one intensity signal indicative of the intensity of the radiation;
   determining the intensity of the radiation due to a combination of the torque acting upon the shaft and the contamination of the sensor;
   determining the intensity of the radiation due to the contamination of the sensor only; and
   calculating the difference between the intensity of the radiation due to a combination of the torque acting upon the shaft and the contamination of the sensor and the intensity of the radiation due to the contamination of the sensor only to generate a compensated signal indicative only of the torque acting upon the shaft.

6. The method as set forth in claim 5 further comprising scaling the compensated signal by a gain factor equal to the ratio of the value of a reference signal to the value of the fourth intensity signal.

7. The method as set forth in claim 5 wherein generating radiation of at least one wavelength comprises generating radiation at a first wavelength and at a second wavelength.

8. The method as set forth in claim 7 wherein generating radiation at a first wavelength and at a second wavelength comprises alternately generating radiation at the first wavelength and at the second wavelength.

9. The method as set forth in claim 8 wherein alternately generating radiation at the first wavelength and at the second wavelength comprises alternately generating radiation having a wavelength in the visible spectrum and radiation having a wavelength in the infrared spectrum.

10. The method as set forth in claim 5 wherein conditioning the radiation comprises directing the radiation through one polarizer.

11. The method as set forth in claim 7 further comprising selecting a first intensity signal indicative of the intensity of the radiation sensed at the first wavelength and a second intensity signal indicative of the intensity of the radiation sensed at the first wavelength while generating radiation at the first wavelength or selecting a third intensity signal indicative of the intensity of the radiation sensed at the second wavelength and a fourth intensity signal indicative of the intensity of the radiation sensed at the second wavelength while generating radiation at the second wavelength.

12. The method as set forth in claim 11 further comprising comparing a reference signal with the first intensity signal generating thereby a first error signal or with the third intensity signal generating thereby a second error signal.

13. The method as set forth in claim 12 further comprising responsive to the first and second error signals generating a drive signal to adjust the intensity of the generated radiation.

14. A torque sensor for determining the torque acting upon a shaft, the torque sensor comprising:
   a radiation source emitting radiation of at least one wavelength;
   at least one sensor sensing the emitted radiation generating thereby at least one intensity signal indicative of the intensity of the emitted radiation;
   at least one signal conditioner receptive of the emitted radiation and positioned on a shaft between the radiation source and the at least one sensor thereby conditioning the emitted radiation;
   a circuit receptive of the at least one intensity signal determining thereby the torque acting upon the shaft and compensating for the attenuation of the emitted radiation; and
   wherein the radiation source comprises a plurality of parallel light emitting diodes having alternate anodes connected either to electrical ground or energized by a prescribed voltage and alternate cathodes connected either to electrical ground or energized by the prescribed voltage.

15. The torque sensor as set forth in claim 1 wherein the at least one sensor comprises a photodiode.

16. The torque sensor as set forth in claim 1 wherein the plurality of light emitting diodes comprise:
   a first light emitting diode having an anode connected to electrical ground and a cathode connected to a prescribed voltage, the first light emitting diode thereby emitting radiation at a first wavelength of the at least one wavelength; and
   a second light emitting diode having a cathode connected to electrical ground and an anode connected to the prescribed voltage, the second light emitting diode thereby emit radiation at a second wavelength of the at least one wavelength.

17. The torque sensor as set forth in claim 1 wherein the circuit is receptive of the at least one intensity signal thereby determining the torque acting upon the shaft.

18. The torque sensor as set forth in claim 1 wherein the circuit is receptive of the at least one intensity signal thereby controlling the wavelength of the emitted radiation.

19. The torque sensor as set forth in claim 1 wherein the circuit comprises an integrated circuit.

20. The torque sensor as set forth in claim 1 further comprising a cover encasing the radiation source, the at least one sensor, the at least one signal conditioner and the circuit.

21. The torque sensor as set forth in claim 1 wherein the at least one signal conditioner comprises a plurality of polarizer having polarization axes oriented at a prescribed angle with respect to one another.

22. The torque sensor as set forth in claim 21 further comprising at least one other sensor disposed between a first polarizer of said plurality of polarizers and a second polarizer of said plurality of polarizers, said other sensor sensing the emitted radiation and generating thereby at least one other intensity signal indicative of the intensity of the emitted radiation.

23. The torque sensor as set forth in claim 22 wherein said circuit is further receptive of the at least one other intensity signal determining thereby the torque acting upon the shaft and compensating for the attenuation of the emitted radiation.

24. The torque sensor as set forth in claim 21 wherein the circuit comprises:
  a clock generating a timing signal;
  at least one switch receptive of the timing signal and connected to the at least one sensor selecting either a first set of intensity signals indicative of the intensity of polarized radiation sensed at the first wavelength or a second set of intensity signals indicative of the intensity of non-polarized radiation sensed at the second wavelength;
  a comparator comparing either a first intensity signal indicative of the intensity of the radiation sensed at the first wavelength to a reference signal to generate a first error signal or a second intensity signal indicative of indicative of the radiation sensed at the second wavelength to the reference signal to generate a second error signal; and
  a drive circuit receptive of the timing signal and the first and second error signals generating thereby a drive signal to control the emission of radiation from the radiation source.

25. The torque sensor as set forth in claim 24 further comprising:
  a summing device receptive of a third intensity signal indicative of the intensity of the radiation sensed at the first wavelength and a fourth intensity signal indicative of the intensity of the radiation sensed at the second wavelength thereby determining the difference thereof and generating a compensated signal indicative of the attenuation of the radiation received by the polarizers due to a change in the angle between the axes of polarization;
  a scaling device receptive of the fourth intensity signal, the compensated signal and the reference signal generating thereby a scaled compensated signal.

26. The torque sensor as set forth in claim 24 further comprising:
  a first amplifier amplifying the radiation sensed at the first sensor; and
  a second amplifier amplifying the radiation sensed at the second sensor.

27. The torque sensor as act forth in claim 24 wherein the reference signal comprises a bandgap reference voltage.

28. The torque sensor as set forth in claim 24 wherein the at least one switch comprises:
  a first switch receptive of the timing signal and connected to a first sensor of the at least one sensor to alternately generate either a first intensity signal indicative of the intensity of polarized radiation at the first wavelength captured by the first sensor or a second intensity signal indicative of the intensity of non-polarized radiation at the second wavelength captured by the first sensor; and
  a second switch synchronously receptive of the timing signal with the first switch and connected to a second sensor of the at least one sensor to alternately generate either a third intensity signal indicative of the intensity of polarized radiation at the first wavelength captured by the second sensor or a fourth intensity signal indicative of the intensity of non-polarized radiation at the second wavelength captured by the second sensor.

29. The torque sensor as set forth in claim 24 further comprising:
  a first amplifier connected to the at least one switch for processing a signal indicative of the intensity of the light received at the first sensor at the first wavelength and providing as output a signal indicative of the intensity of the polarized visible light captured by the first sensor;
  a second amplifier connected to the at least one switch for processing a signal indicative of the intensity of the light received at the first sensor at the second wavelength and providing as output a signal indicative of the intensity of the non-polarized infrared light captured by the first sensor;
  a third amplifier connected to the at least one switch for processing a signal indicative of the intensity of the light received at the second sensor at the first wavelength and providing as output a signal indicative of the intensity of the polarized visible light captured by the second sensor; and
  a fourth amplifier connected to the at least one switch for processing a signal indicative of the intensity of the light received a the second sensor at the second wavelength and providing as output a signal indicative of the intensity of the non-polarized infrared light captured by the second sensor.

30. The torque sensor as set forth in claim 29 wherein processing a signal comprises at least amplifying or rectifying or filtering the signal or amplifying or rectifying and filtering the signal.

31. The torque sensor as set forth in claim 24 wherein the plurality of switches are synchronously receptive of the timing signal.

32. The torque sensor as set forth in claim 31 wherein the drive signal is in phase with the timing signal.

33. The torque sensor as set forth in claim 32 wherein the drive signal is a bipolar signal.

34. The torque sensor as set forth in claim 32 wherein the timing signal is a binary signal.

* * * * *